United States Patent

Scheffel

Patent Number: 5,265,913
Date of Patent: Nov. 30, 1993

[54] LEVELING SYSTEM FOR VEHICLES

[75] Inventor: Martin Scheffel, Vaihingen-Enzweihingen, Fed. Rep. of Germany

[73] Assignee: Robert Bosch GmbH, Stuttgart, Fed. Rep. of Germany

[21] Appl. No.: 882,799

[22] Filed: May 14, 1992

[30] Foreign Application Priority Data

May 14, 1991 [DE] Fed. Rep. of Germany ....... 4115595

[51] Int. Cl.$^5$ .......................... B60S 9/00; B60G 11/26
[52] U.S. Cl. .................................. 280/840; 280/714; 280/709
[58] Field of Search ...................... 280/714, 6.12, 6.11, 280/840, 707, 709; 180/41

[56] References Cited

U.S. PATENT DOCUMENTS

| 3,895,816 | 7/1975 | Takahashi | 280/6.12 |
| 4,205,864 | 6/1980 | Hoefer | 280/714 |
| 4,542,678 | 9/1985 | Kochendorfer et al. | 91/6 |
| 4,911,469 | 3/1990 | Kawarasaki et al. | 280/707 |
| 5,067,743 | 11/1991 | Kokubo et al. | 280/840 X |
| 5,085,460 | 2/1992 | Takahashi | 280/840 X |

FOREIGN PATENT DOCUMENTS

| 3728694 | 3/1989 | Fed. Rep. of Germany | 280/714 |
| 3823043 | 1/1990 | Fed. Rep. of Germany | 280/714 |
| 0063912 | 3/1990 | Japan | 280/840 |

Primary Examiner—Margaret A. Focarino
Assistant Examiner—Florian Zeender
Attorney, Agent, or Firm—Edwin E. Greigg; Ronald E. Greigg

[57] ABSTRACT

A leveling system for vehicles has at least one pressure-fluid-actuated work cylinder disposed between the vehicle body and the wheel suspension, a pressure fluid source and a pressure fluid sink for supplying pressure fluid to the actuator, and a proportional pressure regulating valve for controlling the flow of pressure fluid. The proportional pressure regulating valve has a main valve and a pilot control valve for controlling the main valve control slide into at least three slide positions; in the middle slide position the three controlled valve connections of the main valve are blocked off. To avoid abrupt changes in position of the vehicle body when the leveling system is put into operation, on the one hand a pressure holding valve that can be pushed open is disposed in the pressure fluid line from the work cylinder to the main valve, and on the other, a pressure-fluid-actuated centering device is provided in the main valve; no later than upon a pressure buildup by the pressure fluid source, this centering device fixes the control slide in its middle slide position, and it releases it again immediately after the opening of the pressure holding valve.

29 Claims, 4 Drawing Sheets

LEVELING SYSTEM FOR VEHICLES

BACKGROUND OF THE INVENTION

The invention is based on a leveling system for vehicles.

Such leveling systems serve the purpose of active control of the chassis, and primarily of the wheel suspension of a vehicle, in order to suppress positional changes of the vehicle body and absorb impacts, and thus attain a comfortable, stable vehicle performance.

As in a known leveling system type referred to at the outset (German Patent Disclosure Document 39 10 030 A1), the proportional pressure regulating valve is triggered by an electric control unit for this purpose. The control unit communicates with a number of vehicle height meters, which are associated with the various wheel suspensions and sample the relative height of the vehicle body with reference to the wheel supports. Acceleration sensors for transverse and longitudinal acceleration of the vehicle are also provided, which furnish parameters that characterize the driving situation to the control unit. From the sensor signals, the control unit executes a suspension control for suppressing vehicle body roll, rocking and bounce. To this end, the pressures in the hydraulic work cylinders or actuators, disposed between the wheel suspensions and the vehicle body, are adjusted accordingly by suitable triggering of the pressure regulating valves associated with the various actuators.

When the known leveling systems are put into operation, which takes place upon vehicle starting, abrupt changes in position of the vehicle body can occur, particularly if the vehicle has been parked for a long time or if one of the sensors is defective.

OBJECT AND SUMMARY OF THE INVENTION

The leveling system according to the invention, has an advantage of the prior art that after starting of the vehicle the chassis regulation is put into operation by gradually releasing the control slide in the main valve from its middle slide position, absolutely without jerking, even if one of the sensors should be defective. By means of suitable damping, the releasing operation can be carried out with an adequately long time constant.

The centering device for the control slide according to the invention can, in a preferred embodiment of the invention, be realized in a simple manner by means of two centering pistons disposed on axially opposed sides of the control slide, which with one piston face each limit a pressure chamber that can be acted upon with pressure fluid and which are axially displaceable counter to a centering spring by pressure fluid pressure. Each centering piston has a piston rod that extends axially away from it and is approximately aligned with the control slide axis. A stationary stop shoulder that limits the displacement stroke is provided in the displacement path of each centering piston; the location of the stop shoulder and the length of the piston rod are adapted to one another in such a way that when the two centering pistons are resting on the associated stop shoulders, the two piston rods fix the control slide in its middle slide position by resting on the end faces of the control slide.

In an advantageous embodiment of the invention, the pressure holding valve and a switch valve that in its uncontrolled basic position connects the control inlet of the pressure holding valve to the pressure fluid sink and in its reversed work position connects it to the pressure fluid source are used to control the centering device.

In another embodiment of the invention, for this purpose, each pressure chamber of the centering device is made to communicate on the one hand with the switching valve in such a way that it communicates with the pressure fluid source in the basic position of the switching valve and is blocked off in the work position of the switching valve, and on the other hand communicates continuously with the pressure fluid tank via a throttle. The pressure holding valve has a controlled valve connection, which communicates with each pressure chamber and when the pressure holding valve is closed, communicates with the control inlet of the pressure holding valve via a check valve, while when the pressure holding valve is open, the controlled valve connection is disconnected from this control inlet. The switching valve is embodied as a pressure-fluid-controlled 3/2-way valve with spring restoration, to the control inlet of which a 3/2-way magnet valve is connected and which is adjusted such that below a predetermined control pressure at its control inlet it is restored to its basic position.

As a result of these provisions, it can be attained that as the pressure source is put into operation, the control slide is moved to its middle position and fixed there, as the system pressure rises. It is also assured that both upon the shutoff of the switching valve and upon a drop in the system pressure made available by the pressure fluid source below a predetermined pressure that is below the specified value of the control pressure at the control inlet of the switching valve, the control slide is immediately centered in its middle position in which the valve connections are blocked off. The pressure holding valve is also simultaneously returned to its shutoff position.

In an alternative embodiment of the invention, each pressure chamber of the centering device communicates with the switching valve in such a way that in the basic position of the switching valve, it communicates with the pressure fluid tank and in the work position of the switching valve is blocked off. The pressure holding valve has a controlled valve connection, communicating with each pressure chamber, which is blocked off when the pressure holding valve is closed and communicates with the control inlet of the pressure holding valve when the pressure holding valve is opened. A throttle or a check valve with an open direction toward the pressure chambers is disposed in the connection between this controlled valve connection and the pressure chambers of the centering device. The switching valve here is embodied as a 3/2-way magnet valve with spring restoration.

These provisions make it possible for the fixation device to keep the control slide fixed when the pressure fluid source is inactive, and to gradually reduce it when the system pressure is increased by the pressure fluid source that is turned on. If the system pressure drops, for example from a malfunction or from extreme vehicle maneuvers, then first the possible stroke of the control slide is restricted, and if the pressure drops further the control slide is fixed in its middle position. If the system rises still further, then the entire slide stroke of the control slide is enabled slowly again.

Advantageously, the pressure holding valve is formed of two pressure-tight seat valves, which are associated with the two actuators belonging to a common wheel axle and are combined into a valve unit; in the closing position of the seat valves, a throttle connection between the two actuators is established. These provisions avoid unstable driving conditions of the vehicle that might occur if because of a defect in the leveling system the pressure holding valve were to close, in response to highly different pressures in the actuators of the left and right wheel suspension of one vehicle axle. In that case, the throttle connection makes a pressure equilibrium possible between the actuators, thus bringing about a stable vehicle performance.

In a further embodiment of the invention, a fourth slide position of the control slide is provided as its terminal position in the main valve; in the absence of control pressure, the control slide is moved into this terminal position by the restoring spring, and in that position the control slide blocks off the three valve connections. This assures that the main valve will assume a blocking position for the valve connections if the leveling system should fail.

To avert discontinuities in the controlled region caused by the control slide mistakenly approaching its terminal position during the control process, a further embodiment of the invention provides that a damping piston is rigidly joined to the control slide; the damping piston defines a damping chamber connected to the pilot control valve. Suitable provisions assure that during the opening phase of the pilot control valve, or in other words in controlled operation of the main valve, a minimum pressure that actuates the damping piston counter to the adjustment direction of the restoring spring is modulated in the damping chamber, and this minimum pressure prevents a return of the control slide to its terminal position.

To this end, in accordance with a preferred embodiment of the invention, the damping piston is embodied on a control piston formed on the control slide, and the damping chamber is embodied directly adjacent a control chamber defined by the control piston and is open toward that control chamber. The pilot control valve is disposed on the pressureless side of the main valve, and the valve inlet of the pilot control valve communicates on the one hand with the control chamber and on the other, with the incorporation of suitable throttle restrictions, with the damping chamber and the pressure fluid source.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
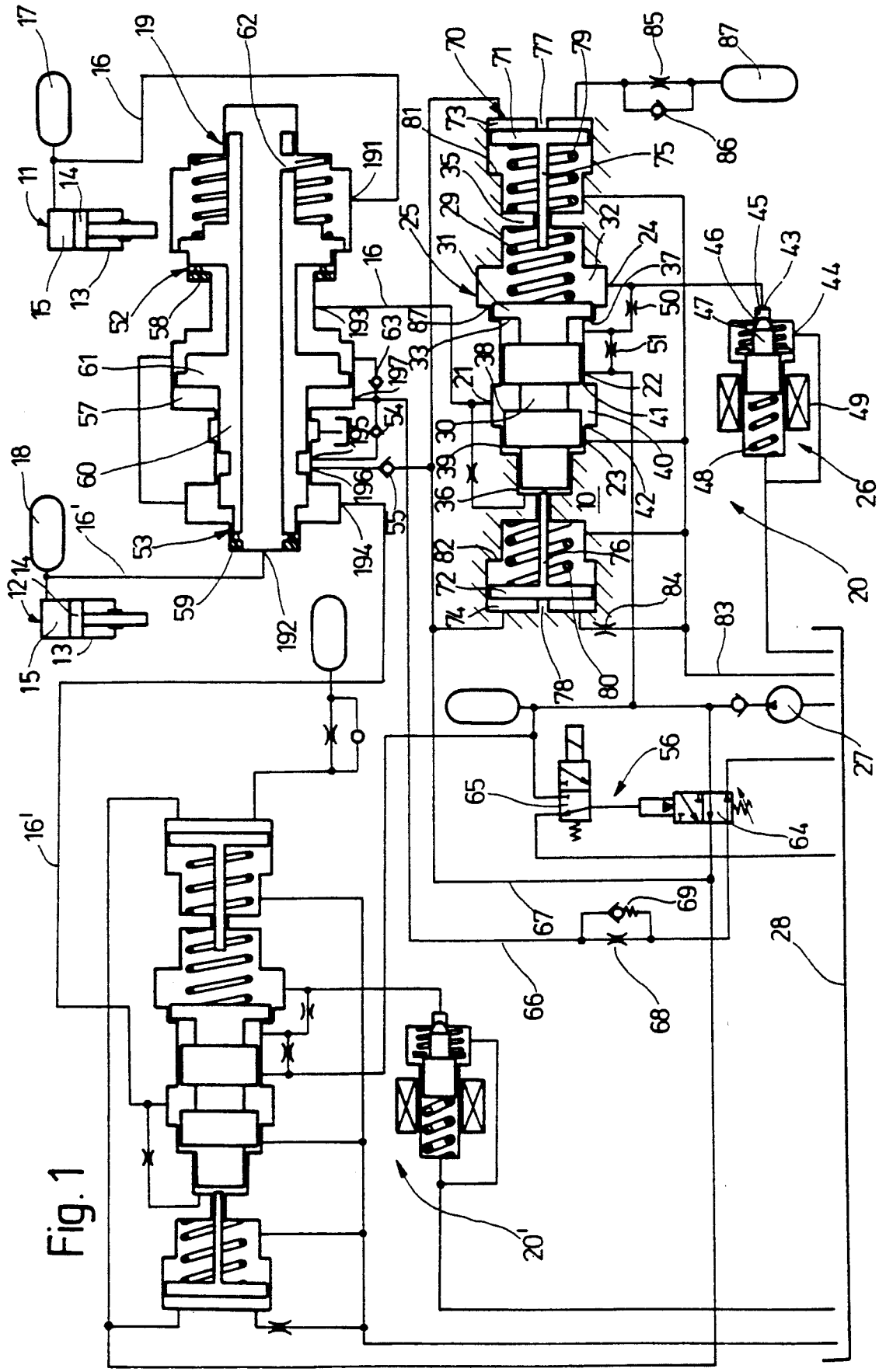
FIG. 1 is a basic circuit diagram of a hydraulic leveling system for two actuators, assigned to one vehicle axle, in the chassis of a vehicle, with the structure of the pressure regulating valve shown schematically.

The hydraulic leveling system for a vehicle, schematically sketched in FIG. 1, serves to regulate the level of the vehicle and the relative motion of the vehicle body to a set point. The wheel supports are part of suspension mechanisms disposed at the left and right front and left and right rear, and they rotatably support corresponding wheels. A hydraulic work cylinder or actuator, of which FIG. 1 shows only the two actuators 11, 12 that are pivotably connected to the two wheel suspensions belonging to one vehicle axle, is disposed between the vehicle body and each wheel support. Each actuator 11, 12 has a work piston 14, guided axially displaceable in a hydraulic cylinder 13, and defining a work chamber 15 in that hydraulic cylinder 13, filled with hydraulic oil or some other fluid. For controlling the pressure in the work chamber 15, each actuator 11, 12 is assigned one proportional pressure regulating valve 20, 20'. The two proportional pressure regulating valves 20, 20' are identically embodied, so that hereinafter only the proportional pressure regulating valve 20 assigned to the actuator 11 will be described. Each work chamber 15 is connected via a pressure line 16 and 16' to a first valve connection 21 of the proportional pressure regulating valve 20 or 20', and the two pressure lines 16, 16' are guided by way of a pressure holding valve 19. A further pressure reservoir 17 and 18, respectively, is connected to the pressure line connection of each work chamber 15.

The proportional pressure regulating valve 20 (like the proportional pressure regulating valve 20') has a hydraulically controlled main valve 25 with three controlled valve connections 21, 22, 23 and a control inlet 24 as well as an electromagnetically controlled pilot control valve 26. The first valve connection 21 communicates with the pressure line 16, as already noted; the second valve connection 22 communicates with a pressure fluid source 27, and the third valve connection 23 communicates with a pressure fluid tank 28. Typically, the pressure fluid tank 28 is embodied by a hydraulic oil container, and the pressure fluid source 27 is embodied by a feed pump that pumps hydraulic oil out of the hydraulic oil container.

The main valve 25 is embodied as a ¾-way valve and has a control slide 30 that is axially displaceable, counter to a restoring spring 29, into four different slide positions for controlling the three valve connections 21 to 23. In a neutral middle position of the control slide 30, the three valve connections 21 to 23 are blocked off. The control slide 30 can be displaced to the left or right from this neutral middle position by suitable triggering via the pilot control valve 26; if the control slide is shifted to the left, the first valve connection 21 is made to communicate with the second valve connection 22, and if it is shifted to the right, the first valve connection 21 is made to communicate with the third valve connection 23. In the terminal position (failsafe position) of the control slide 30 shown in FIG. 1, into which the control slide 30 is displaced by the restoring spring 29 in the absence of control pressure, all three valve connections 21 to 23 are likewise blocked off. For hydraulic control of the control slide 30, an annular flange 31 is formed on its right-hand end as seen in FIG. 1; this flange protrudes into a control chamber 32 and has an annular pressure impingement face 33 on its side toward the control slide 30. The free face end of the annular flange 31 is engaged by the restoring spring 29, which is supported on a rib 35 that is embodied in a valve body 10 symbolized by shading; the valve body 10 in turn axially displaceably receives the control slide 30 in a bore 36. On the bottom of the control chamber 32 toward the pressure impingement face 33, an axial indentation 37 forms a damping chamber, which cooperates with the annular flange 31, acting as a damping piston, in a manner to be described hereinafter. For controlling the valve connections 21 to 23, the control slide 30 has two circular control edges 38, 39, which cooperate with two control edges 41, 42 that are formed on an annular groove 40 made in the bore 36. The first valve connection 21 discharges into the annular groove 40, while the second and third valve connections 22, 23 discharge in the bore 36 to the right and left of the annular groove 40.

The pilot control valve 26 has a valve opening 45, disposed between a valve inlet 43 and a valve inlet 44, and a valve seat 46 is formed on this valve opening 45. Cooperating with the valve seat 46 is a valve member 47, embodied as a valve cone, which is pressed against the valve seat 46 by a valve closing spring 48 and driven in the opening direction by a proportional magnet 49. The valve inlet 43 communicates on the one hand directly with the control chamber 32 and on the other via a first throttle 5 with the indentation 37 forming the damping chamber. The connection of the first throttle 50 to the indentation 37 is connected to the second valve connection 22 by a second throttle 51. The throttle cross section of the second throttle 51 is of substantially larger size than that of the first throttle 50.

The pressure holding valve 19 has two pressure-tight seat valves 52, 53, disposed axially one behind the other; of them, the seat valve 52 is incorporated into the pressure line 16 and the seat valve 53 is incorporated into the pressure line 16, The pressure holding valve 19 is thus embodied overall as a 6/2-way seat valve, and correspondingly has six controlled valve connections 191 to 196 and one control connection 197. The first valve connection 191 communicates with the work chamber 15 of the actuator 11; the second valve connection 192 communicates with the work chamber 1 of the actuator 12; the third valve connection 193 communicates with the work connection of the pressure regulating valve 20 (first valve connection 21 of the main valve 25); the fourth valve connection 194 communicates with the corresponding work connection of the proportional pressure regulating valve 20'; the fifth valve connection 195 communicates with the control connection 197 via a check valve 54, the open direction of the check valve is toward the fifth valve connection 195; and the sixth valve connection 196 communicates with a switching valve 56, to be described below, via a check valve 55. By suitable structural provisions, the two seat valves 52, 53 are largely pressure-equalized both upon valve opening and upon valve closure of the pressure holding valve 19. Elastomer seals 58, 59, which are disposed on corresponding valve seats and each cooperate with one valve member, assure the pressure tightness of the seat valves 52, 53. The valve members of the seat valves 52, 53 are molded onto a common hollow-cylindrical actuation slide 60, which with a control piston 61 is axially displaceably guided in a control chamber 62. When the pressure holding valve 19 is closed, the first and second valve connections 191, 192 communicate with one another via the hollow interior of the actuation slide 60 and a throttle bore 62 in the actuation slide 60; as a result, the two pressure chambers 15 of the actuators 11, 12 communicate with one another. By means of this throttle bore 62, it is assured that when the pressure holding valve 19 is closed, a pressure equalization between the actuators 11, 12 can take place; this is important for maintaining stable vehicle performance in the event that the pressure holding valve 19 should close suddenly and that the actuator pressures differ markedly from one another.

The switching valve 56 comprises a hydraulically controlled 4/2-way valve 64 with spring restoration and a 3/2-way magnet valve, controlling it, with spring restoration. The restoring spring of the 4/2-way valve 64 is adjusted such that below a control pressure of 120 bar, the multi-position valve 64 drops back to its basic position. The 4/2-way valve 64 communicates on the one hand with the pressure fluid source 27 and on the other with the pressure fluid sink 28, and also via a control line 66 with the control connection 197 of the pressure holding valve 19 and via a connecting line 67 with the sixth valve connection 196, occupied by the check valve 55, of the pressure holding valve 19. The 4/2-way valve 64 is embodied such that in its uncontrolled basic position, it connects the connecting line 67 to the pressure fluid source 27 and the control line 66 to the pressure fluid sink 28, while in its reversed work position it connects the control line 66 to the pressure fluid sink 27, and blocks off the connecting line 67 and the line to the pressure fluid sink 28. The 3/2-way magnet valve 65 is embodied such that in its basic position it connects the control inlet of the 4/2-way valve 64 to the pressure fluid sink 28, and in its work position it connects it to the pressure fluid source 27. A throttle 68 is disposed in the control line 66, and a check valve 69 having an open direction toward the 4/2-way valve 64 is connected parallel to this throttle.

For moving the control slide 30 in the main valve 25 into its neutral position blocking the valve connections 21-23 and centering it there before the leveling system is put into operation, a centering device 70 is provided on the main valve 25; it has two centering pistons 71, 72, disposed on axially opposite sides of the control slide 30, each with one piston face define a respective pressure chamber 73 and 74 that can be acted upon by pressure fluids. The centering pistons 71, 72 each have a respective piston rod 75, 76, which extends axially away from the piston face toward the control slide 30, in alignment with the axis of the control slide. A stop 77, 78 is disposed in each pressure chamber 73, 74, and the centering piston 71, 72 is pressed against this stop by a respective centering spring 79, 80 if the pressure chamber 73, 74 is pressureless. A stop shoulder 81, 82 is provided in the displacement path of each centering piston 71, 72 toward the centering spring 79, 80. The location of the stop shoulders 81, 82 and the length of the piston rods 75, 76 are adapted to one another such that when the centering pistons 71, 72 rest on the stop shoulder 81, 82, the piston rods 75, 76 rest on the face ends of the control slide 30 and fix it in a neutral middle position. The pressure chambers 73, 74 are connected to the connecting line 67 leading to the switching valve 56. A relief line 83 also begins at the pressure chamber 74 and leads to the pressure fluid tank 28; a throttle 84 is disposed in this relief line. The other pressure chamber 73 communicates with a pressure reservoir 7, via a throttle 85 having a parallel-connected check valve 86.

The mode of operation of the leveling system described is as follows:

In FIG. 1, the leveling system is shown in the pressureless state. The pressure holding valve 19 is closed, as is the pilot control valve 26, and the main valve 25 is located in its failsafe position. Once the pressure fluid source 27 is turned on (which occurs upon vehicle starting), the system pressure is built up. As the system pressure rises, the pressure in the pressure chambers 73, 74 of the centering device 70 increases, as a result of which the centering pistons 71, 72 are displaced toward the centering springs 79, 80, and via their piston rods 75, 76 they move the control slide 30 to its neutral middle position and fix it there.

Upon actuation of the switching valve 56, this valve is switched over and connects the pressure fluid source 27 with the control line 66; simultaneously, the connecting line 67 to the centering device 70 is blocked off. Hydraulic oil now flows from the control line 66 via the check valve 54 and the fifth and sixth valve connections 195, 196 of the pressure holding valve 19 and via the check valve 55 to the pressure chambers 73, 74 of the centering device 70, so that initially the pressure is maintained there. At the same time, the seat valves 52, 53 in the pressure holding valve 19 are equalized in pressure, since a pressure also builds up upstream of the valve members of the seat valves 51, 52 via the check valve 63 that connects the portions of the control chamber upstream and downstream of the control piston 61. After the pressure equilibrium has been established, the pressure holding valve 19 opens, and the actuating slide 60 disconnects the sixth valve connection 196 from the fifth valve connection 195, and the control piston 61 blocks off the check valve 63. This interrupts the supply of pressure to the centering pistons 71, 72. Via the throttle 84, the pressure in the pressure chambers 73, 74 drops toward the pressure fluid tank 28, and the centering pistons 71, 72 move slowly and in damped fashion outward, in so doing releasing the control slide 30 for free axial displacement. The duration of the pressure reduction in the pressure chambers 73, 74 can be adjusted by means of the adjustment of the throttles 84, 85 and the dimensioning of the reservoir 87. Once the switching valve 56 is returned again, the centering device 70 responds immediately, and the control slide 30 of the main valve 25 is again fixed in its middle position. Simultaneously, the pressure holding valve 19 closes as well and via the throttle bore 62 enables the pressure equilibrium between the actuators 11, 12. The same process occurs if the system pressure drops below the minimum range that can be adjusted at the 4/2-way valve 64.

The proportional magnet 49 of the pilot control valve 26 is operated with an exciter current such that the control slide 30 initially maintains its neutral middle position. For pressure buildup in the actuator 11 with the pressure holding valve 19 opened, the control slide piston 30 is shifted to the left in FIG. 1 as a result of a decrease in the throttle cross section of the valve opening 45 of the pilot control valve 26, so that a communication is established between the first valve connection 21 and the second valve connection 22. In controlled operation of the pilot control valve 26, a minimum current is then delivered to the proportional magnet 49, such that the throttle cross section at the valve opening 45 is somewhat larger than the throttle cross section of the throttle 50. As a result, a pressure is built up in the damping chamber 37 such that the annular flange 3 cannot overtake the control edge 87 at the damping chamber 37. This prevents the control slide 30 during the controlled operation from assuming the terminal (failsafe) position shown in FIG. 1, thereby averting discontinuities during controlled operation. Only when the proportional magnet 49 of the pilot control valve 26 is currentless does the pilot control valve 26 close, and hydraulic oil then flows via the throttle 50 into the control chamber 32 to the back side of the annular flange 31. Under the influence of the restoring spring 29, the control slide 30, changes to its terminal position shown in FIG. 1, in which it covers the valve connections 21, 22 and 23. To lower the pressure in the actuator 11, the exciter current for the proportional magnet 49 in the pilot control valve 26 is increased. The cross section of the valve opening 45 is increased, and as a result the control slide 30 is moved to the right in FIG. 1 and establishes a communication between the valve connections 21 and 23.

A number of safety functions are thus achieved in the leveling system described. The pressure holding valve 19 has long-term pressure tightness because of the elastomer seals 58, 59. The service life of the pressure holding valve 19 is very long, because the seat valves 52, 53 only open after pressure equilibrium, and thus only a slight pressure difference and low flow speeds arise at the elastomer seals 58, 59. With the pressure holding valve 19 closed, a pressure equilibrium is established between the actuators 11, 12 via the throttle bore 62; this avoids any possible tilting of the vehicle after the failure of the leveling system. Because the fixation device 70 does not release until after opening of the pressure holding valve 19, the leveling control begins without jerking, from the neutral middle position of the main valve 25. The control slide 30 is released only gradually. Upon a pressure drop, the stroke of the control slide 30 is restricted, or the slide is fixed in its neutral middle position. If the pilot control valve 26 fails, the control slide 30 moves to its failsafe position, and the main valve 25 is closed.

Figure 2:
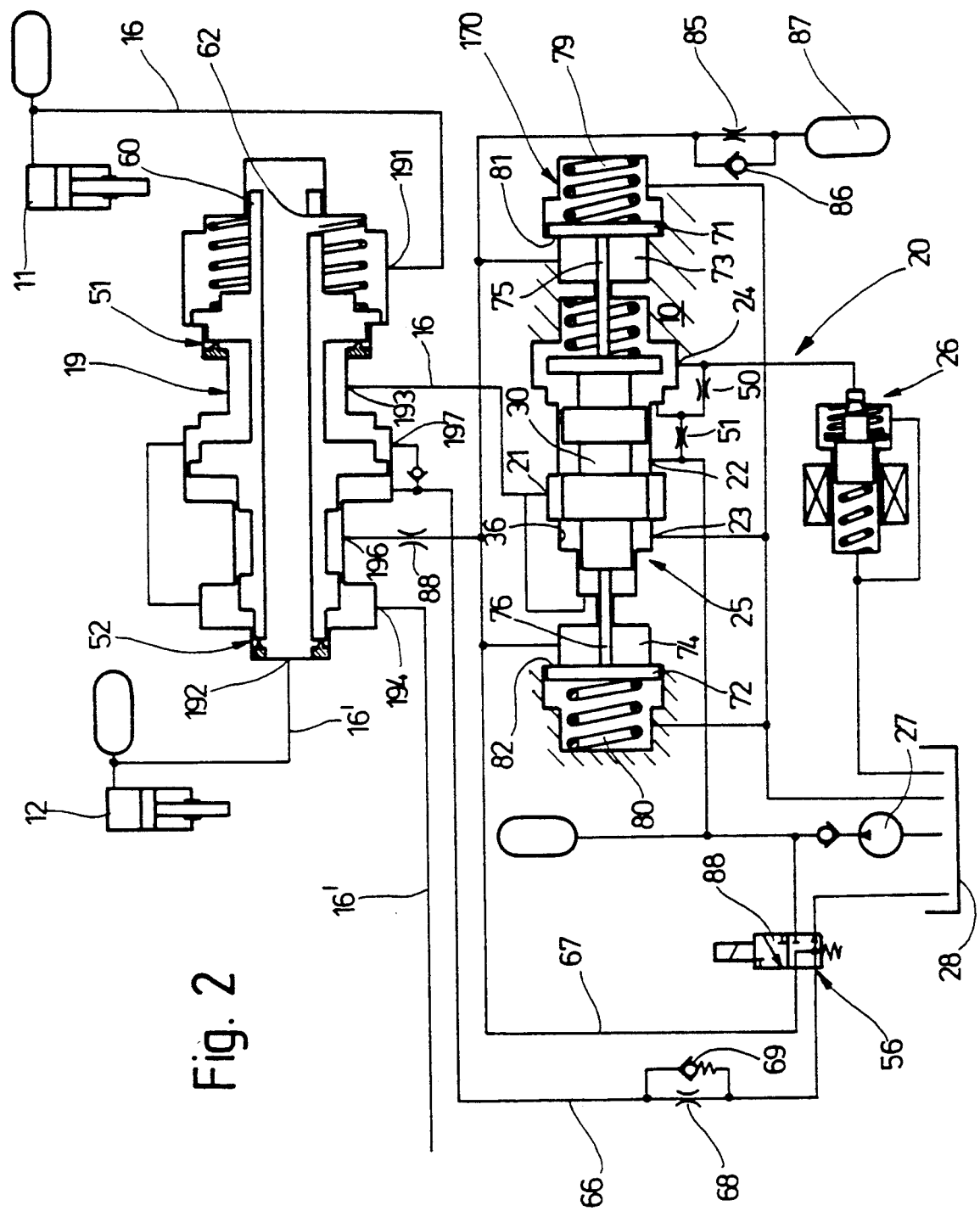
FIG. 2 is a diagram of the same type hydraulic leveling system as FIG. 1, showing a modified leveling system in accordance with a further exemplary embodiment.
Figure 3:
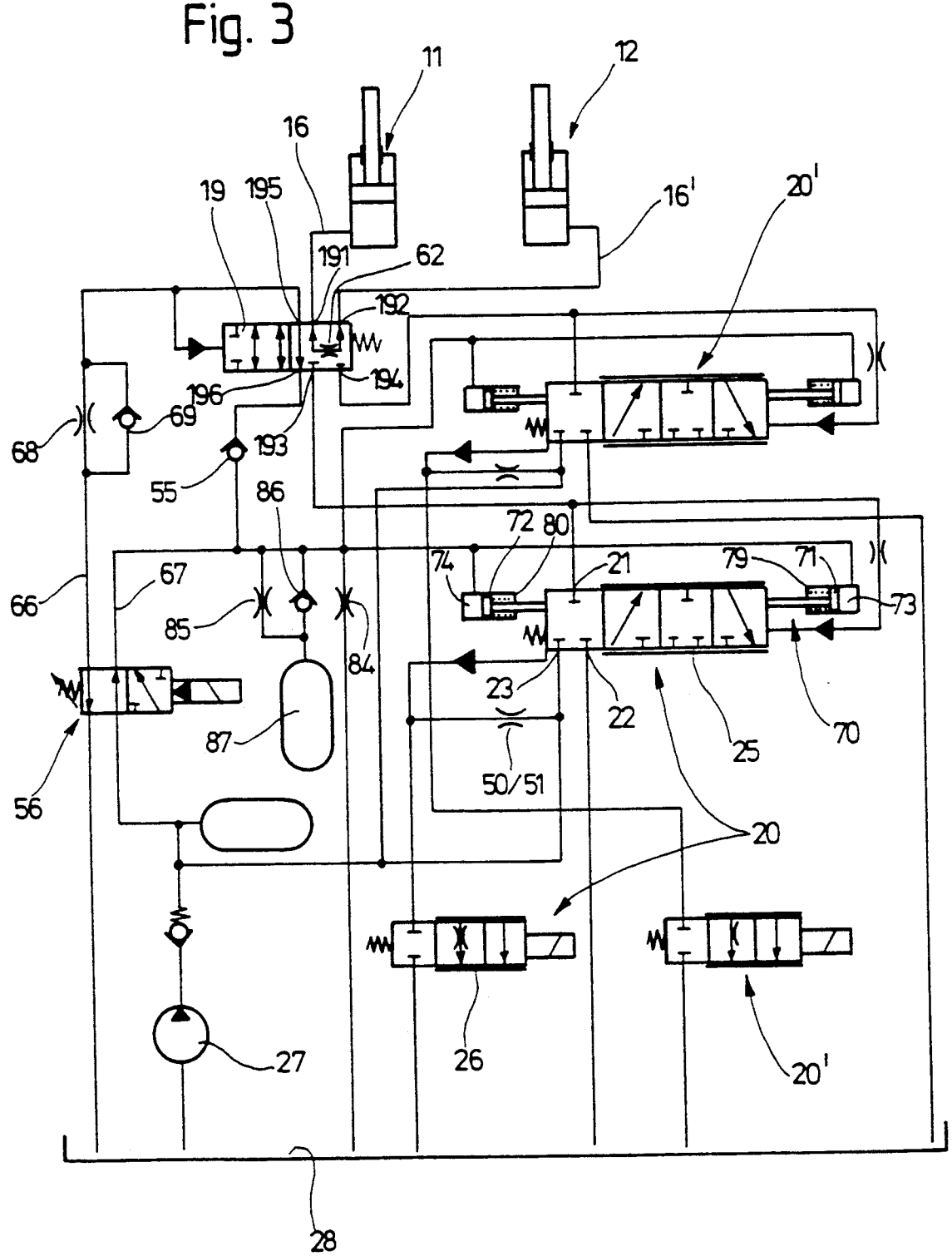
FIGS. 3 and 4 show a circuit diagram of the hydraulic leveling system of FIG. 1 and FIG. 2, respectively, with the valves used represented by like symbols.

For the sake of a better overview of the structure and function of the leveling system described, this system is shown in FIG. 2 in a circuit diagram with switching symbols. Components matching those of FIG. 1 are identified by the same reference numerals.

The leveling system schematically sketched in FIG. 2 differs from the leveling system described above, substantially in a modification of the fixation device 170 for centering the control slide 30 in the main valve 25. For the sake of simplification, the second proportional pressure regulating valve 20' has been left out. For the sake of simplicity, only some reference numerals are shown in the drawing, and all components that match those of FIG. 1 have the same reference numerals. The centering device 170 in FIG. 2 differs from the centering device 70 of FIG. 1 first in that the centering springs 79, 80 engage the centering pistons 71, 72 on the piston face facing the piston rods 75, 76. When the pressure chamber 73, 74 are pressureless, the centering pistons 71, 72 thus rest on their contact shoulders 81, 82. Once again, the two pressure chambers 73, 74 are connected to the connecting line 67 leading to the switching valve 56; here, this line 67 communicates with the sixth control connection 196 of the pressure valve 19 via a throttle 88, instead of the check valve 55 as in FIG. 1. The switching valve 56 is embodied as a 4/2-way magnet valve 89 with spring restoration, which in its unexcited basic position connects the two lines 66, 67 to the pressure fluid sink 28 and blocks off the connecting line to the pressure fluid source 27, and in its work position blocks off the connecting line 67 and connects the control line 66 to the pressure fluid source 27. The fifth valve connection 195 on the pressure holding valve 19 is omitted, and instead the sixth valve connection 196 is controlled by the actuation slide 60 in such a way that it is blocked in the closing position of the pressure holding valve 19 and communicates with the pressure connection 197 in the open position of the pressure holding valve 19.

The mode of operation of this leveling system is only slightly modified compared with the leveling system of FIG. 1. In FIG. 2, the leveling system is shown in the pressureless state. The pressure holding valve 19 and the pilot control valve 26 are closed, and the actuators 11, 12 are pressure-equalized via the throttle bore 62 in the pressure holding valve 19. The centering springs 79, 80 of the centering device 170 keep the control slide 30 of the main valve 25 in its neutral middle position.

The system pressure is built up after the start of the vehicle. After actuation of the switching valve 56, the seat valves 51, 52 are first pressure-equalized. After pressure equilibrium has been achieved, the seat valves 51, 52 open. Shortly before the terminal opening position is reached, the control connection 197 is made to communicate with the sixth valve connection 196, and the pressure supply to the pressure chambers 73, 74 of the centering device 170 is relieved. The opening pressure at the centering pistons 71, 72 is built up slowly, the duration of which is adjustable by means of the throttle 88 and by means of the dimensioning of the reservoir 87 and throttle 85. With the buildup of the opening pressure at the centering pistons 71, 72, the control slide 30 of the main valve 25 is gradually released. If the switching valve 56 is closed again, then the control slide 30 is fixed immediately in its neutral middle position again as a result of a pressure drop in the pressure chambers 73, 74. The pressure holding valve 19, moving to its closing position, connects the two actuators 11, 12 via the throttle bore 62. If the system pressure should drop, for example from a malfunction or from extreme vehicle maneuvering, while the switching valve 56 is in its work position, then first the stroke of the control slide 30 is restricted by the centering pistons 71, 72, and then if there is a further pressure drop the control slide 30 is fixed in its middle position. If the system pressure rises again, then the full stroke of the control slide 30 is slowly enabled once again.

The controlling of the control slide 30 out of its neutral middle position is identical to that described earlier above.

Figure 4:
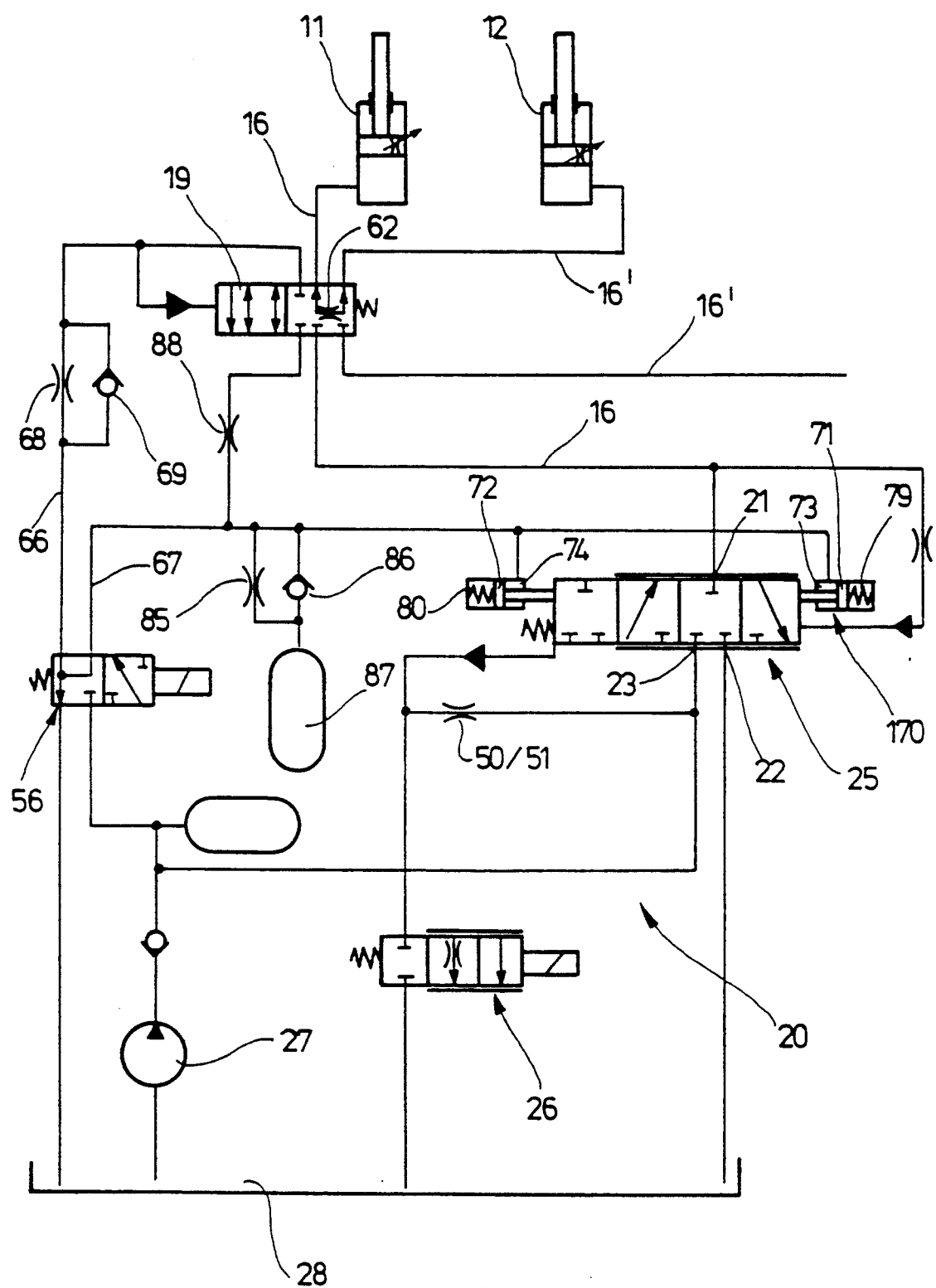

In FIG. 4, again for the sake of a more rapid overview of the structure and operation of the leveling system of FIG. 2, its circuit diagram is shown with switching symbols. In FIGS. 2 and 4, identical components are provided with the same reference numerals.

The invention is not restricted to the exemplary embodiments shown. Thus, compressed air can also be used as the pressure fluid.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A leveling system for vehicles having at least one pressure-fluid-actuated work cylinder (actuator), which is disposed between a vehicle body and a wheel suspension, having a pressure fluid source and a pressure fluid tank for supplying and receiving pressure fluid to and from the work cylinder, a proportional pressure regulating valve for controlling the flow of pressure fluid to and from the work cylinder, which pressure regulating valve has a main valve with at least three valve connections for the pressure fluid source, pressure fluid tank and the work cylinder, and having a pressure-fluid-actuated control slide controlling the valve connections and a pilot control valve for controlling the control slide into at least three slide positions counter to a force of a restoring spring, wherein in a middle slide position the valve connections are blocked and in two other slide positions the valve connection for the work cylinder communicates either with the valve connection for the pressure fluid source or the valve connection for the pressure fluid tank, a pressure holding valve (19) that can be pushed open via a pressure-fluid-actuatable control inlet (197) is disposed in a pressure fluid line (16, 16') from the work cylinder (11, 12) to the valve connection (21) of the main valve (25) assigned to said pressure line (16), and a pressure-fluid-actuated centering device (70; 170) is provided in the main valve (25) that moves the control slide (30) into the middle slide position and locks the control slide there, upon pressure buildup through the pressure fluid source (27), and immediately after opening of the pressure holding valve (19).

2. The system as defined by claim 1, in which the release of the control slide (30) is effected with a time constant.

3. The system as defined by claim 2, in which the centering device (70, 170) has two centering pistons (71, 72), each axially displaceable counter to a centering spring (79, 80) and disposed on axially opposed ends of the control slide (30), each of said two centering pistons has two piston faces with one piston face defining one pressure chamber (73, 74) that can be acted upon with pressure fluid and each of said two centering pistons has a piston rod (75, 76) extending axially away from one piston face and substantially in alignment with a control slide axis; a stationary stop shoulder (81, 82) is disposed in a displacement path of each centering piston (71, 72), limiting a displacement stroke; and a location of the stop shoulders (81, 82) and a length of the piston rods (75, 76) are adapted to one another such that when the two centering pistons (71, 72) rest on the associated stop shoulders (81, 82), the two piston rods (75, 76) fix the control slide (30) in its middle slide position by contacting end faces of the control slide.

4. The system as defined by claim 3, in which the centering device (70; 170) has two centering pistons (71, 72), each axially displaceable counter to a centering spring (79, 80) and disposed on axially opposed ends of the control slide (30), each of said two centering pistons has two piston faces with one piston face defining one pressure chamber (73, 74) that can be acted upon with pressure fluid and each of said two centering pistons has a piston rod (75, 76) extending axially away form one piston face and substantially in alignment with a control slide axis; a stationary stop shoulder (81, 82) is disposed in a displacement path of each centering piston (71, 72), limiting a displacement stroke; and a location of the stop shoulders (81, 82) and a length of the piston rods (75, 76) are adapted to one another such that when the two centering pistons (71, 72) rest on the associated stop shoulders (81, 82), the two piston rods (75, 76) fix the control slide (30) in its middle slide position by contacting end faces of the control slide.

5. The system as defined by claim 3, in which the stop shoulders (81, 82) are disposed in a displacement path of the centering pistons (71, 72) in such a way that a contact of the centering pistons (71, 72) with the contact shoulders (81, 82) is by the action of pressure fluid upon the centering pistons (71, 72).

6. The system as defined by claim 4, in which the stop shoulders (81, 82) are disposed in a displacement path of the centering pistons (71, 72) in such a way that a contact of the centering pistons (71, 72)with the contact shoulders (81, 82) is by the action of pressure fluid upon the centering pistons (71, 72).

7. The system as defined by claim 3, in which the stop shoulders (81, 82) are disposed in a displacement path of the centering pistons (71, 72) in such a way that a contact of the centering pistons (71, 72) with the contact shoulders (81, 82), is by means of the centering springs (79, 80).

8. The system as defined by claim 4, in which the stop shoulders (81, 82) are disposed in a displacement path of the centering pistons (71, 72) in such a way that a contact of the centering pistons (71, 72) with the contact shoulders (81, 82), is by means of the centering springs (79, 80).

9. The system as defined by claim 1, in which the control inlet (197) of the pressure holding valve (19) communicates with a switching valve (56) that in an uncontrolled basic position connects the control inlet (197) of the pressure holding valve (19) with the pressure fluid tank (28) and in a reversed work position connects the control inlet (197) to the pressure fluid source (27), and that the switching valve (56) and the pressure holding valve (19) are used for actuating the centering device (70; 170).

10. The system as defined by claim 2, in which the control inlet (197) of the pressure holding valve (19) communicates with a switching valve (56) that in an uncontrolled basic position connects the control inlet (197) of the pressure holding valve (19) with the pressure fluid tank (28) and in a reversed work position connects the control inlet (197) to the pressure fluid source (27), and that the switching valve (56) and the pressure holding valve (19) are used for actuating the centering device (70; 170).

11. The system as defined by claim 3, in which the control inlet (197) of the pressure holding valve (19) communicates with a switching valve (56) that in an uncontrolled basic position connects the control inlet (197) of the pressure holding valve (19) with the pressure fluid tank (28) and in a reversed work position connects the control inlet (197) to the pressure fluid source (27), and that the switching vale (56) and the pressure holding valve (19) are used for actuating the centering device (70; 170).

12. The system as defined by claim 5, in which the control inlet (197) of the pressure holding valve (19) communicates with a switching valve (56) that in an uncontrolled basic position connects the control inlet (197) of the pressure holding valve (19) with the pressure fluid tank (28) and in a reversed work position connects the control inlet (197) to the pressure fluid source (27), and that the switching valve (56) and the pressure holding valve (19) are used for actuating the centering device (70; 170).

13. The system as defined by claim 7, in which the control inlet (197) of the pressure holding valve (19) communicates with a switching valve (56) that in an uncontrolled basic position connects the control inlet (197) of the pressure holding valve (19) with the pressure fluid tank (28) and in a reversed work position connects the control inlet (197) to the pressure fluid source (27), and that the switching valve (56) and the pressure holding valve (19) are used for actuating the centering device (70; 170).

14. The system as defined by claim 5, in which each pressure chamber (73, 74) of the centering device (70) communicates on the one hand with the switching valve (56) in such a manner that in a basic position of the switching valve (56) each pressure chamber (73, 74) is connected with the pressure fluid source (27) and in a work position of the switching valve (56) each pressure chamber (73, 74) is blocked off from the pressure fluid source, and on the other hand each pressure chamber (73, 74) communicates continuously with the pressure fluid tank (28) via a throttle (84), and that the pressure holding valve (19) has a controlled valve connection (196), communicating with each pressure chamber (73, 74), which connection communicates with the control inlet (197) of the pressure holding valve (19) via a check valve (54)when the pressure holding valve (19) is closed and is disconnected from the control inlet (197) of the pressure holding valve (19) when that valve is opened.

15. The system as defined by claim 6, in which each pressure chamber (73, 74) of the centering device (70) communicates on the one hand with the switching valve (56) in such a manner that in a basic position of the switching valve (56) each pressure chamber (73, 74) is connected with the pressure fluid source (27) and in a work position of the switching valve (56) each pressure chamber (73, 74) is blocked off from the pressure fluid source, and on the other hand each pressure chamber (73, 74) communicates continuously with the pressure fluid tank (28) via a throttle (84), and that the pressure holding valve (19) has a controlled valve connection (196), communicating with each pressure chamber (73, 74), which connection communicates with the control inlet (197) of the pressure holding valve (19) via a check valve (54) when the pressure holding valve (19) is closed and is disconnected from the control inlet (197) of the pressure holding valve (19) when that valve is opened.

16. The system as defined by claim 7, in which each pressure chamber (73, 74) of the centering device (70) communicates on the one hand with a switching valve (56) in such a manner that in a basic position of the switching valve (56) each pressure chamber (73, 74) is connected with the pressure fluid source (27) and in a work position of the switching valve (56) each pressure chamber (73, 74) is blocked off from the pressure fluid source, and on the other hand each pressure chamber (73, 74) communicates continuously with the pressure fluid tank (28) via a throttle (84), and that the pressure holding valve (19) has a controlled valve connection (196), communicating with each pressure chamber (73, 74), which connection communicates with the control inlet (197) of the pressure holding valve (19) via a check valve (54) when the pressure holding valve (19) is closed and is disconnected from the control inlet (197) of the pressure holding valve (19) when that valve is opened.

17. The system as defined by claim 14, in which the switching valve (56) has a pressure-fluid-controlled 4/2-way valve 64 with spring restoration and a 3/2-way magnet valve (65), connected to the control inlet thereof, with spring restoration, and that the spring restoration of the 4/2-way valve (64) is adjusted such that below a predetermined control pressure at its control inlet, this valve drops back to its basic position.

18. The system as defined by claim 14, in which the pressure holding valve (19) comprises a pressure-tight 6/2-way seat valve, which has a first and second valve connection 191, 192), each for one work cylinder (11, 12); a third and fource valve connection (193, 194), each for one proportional pressure regulating valve (20, 20'); a fifth valve connection (195) communicating with the control inlet (197) via a check valve (54); and a sixth valve connection (196) communicating with the two pressure chambers (73, 74) via a check valve (55); and this seat valve is embodied such that in a closing position, the first and second valve connection (191, 192) communicate with one another via a throttle (62), and the fifth and sixth valve connections (195, 196) communicate with one another, and the third and fourth valve connections (193, 194) are blocked; and that in an open position, the first and third and the second and fourth valve connections (191, 193, 192, 194) communicate with one another, and the sixth valve connection (196) is disconnected from the fifth valve connection (195) and blocked off.

19. The system as defined by claim 17, in which the pressure holding vale (19) is embodied as a pressure-tight 6/2-way seat valve, which has a first and second valve connection (191, 192), each for one work cylinder (11, 12); a third and fourth valve connection (193, 194), each for one proportional pressure regulating valve (20, 20'); a fifth valve connection (195) communicating with the control inlet (197) via a check valve (54); and a sixth valve connection (196) communicating with the two pressure chambers (73, 74) via a check valve (55); and this seat valve is embodied such that in a closing position, the first and second valve connection (191, 192) communicate with one another via a throttle (62), and the fifth and sixth valve connections (195, 196) communicate with one another, and the third and fourth valve connections (193, 194) are blocked; and that in an open position, the first and third and the second and fourth valve connections (191, 193, 192, 194) communicate with one another, and the sixth valve connection (196) is disconnected from the fifth valve connection (195) and blocked off.

20. The system as defined by claim 7, in which each pressure chamber (73, 74) of the centering device (170) communicates with the switching valve (56) in such a way that in a basic position of the switching valve (56) the centering device is connected with the pressure fluid tank (28) and is blocked off in a work position of the switching valve (56), and that the pressure holding valve (19) has a controlled valve connection (196), communicating with each pressure chamber (73, 74) via a throttle (88), that is blocked off when the pressure holding valve (19) is closed and communicates with the control inlet (197) of the pressure holding valve when the pressure holding valve (19) is opened.

21. The system as defined by claim 9, in which each pressure chamber (73, 74) of the centering device (170) communicates with the switching valve (56) in such a way that in a basic position of the switching valve (56) the centering device is connected with the pressure fluid tank (28) and is blocked off in a work position of the switching valve (56), and that the pressure holding valve (19) has a controlled valve connection (196), communicating with each pressure chamber (73, 74) via a throttle (88), that is blocked of when the pressure holding valve (19) is closed and communicates with the control inlet (197) of the pressure holding valve when the pressure holding valve (19) is opened.

22. The system as defined by claim 20, in which the switching valve (56) comprises a 4/2-way magnet valve (88) with spring restoration.

23. The system as defined by claim 20, in which the pressure holding valve (19) comprises a pressure-tight 6/2-way seat valve, which has a first and second valve connection (191, 192), each for one work cylinder (11, 12), a third and fourth valve connection (193, 194), each for one proportional pressure regulating vale (20, 20'), a control inlet (197) for connection of the switching valve (56), and a sixth valve connection (196), which communicates with each pressure chamber (73, 74) via a throttle (88), and that the pressure holding valve (19) is embodied such that in a closing position, the first and second valve connections (191, 192) communicate with one another via a throttle bore (62), and the third, fourth and sixth valve connections (193, 194, 196) are blocked off, and that in an open position, the first valve connection (191) and the third valve connection (193), on the one hand, and the second valve connection (192) and the fourth valve connection (194) on the other, each communicate with one another, and the sixth valve connection (196) communicates with the control inlet (197) of the pressure holding valve (19).

24. The system as defined by claim 22, in which the pressure holding valve (19) comprises a pressure-tight 6/2-way seat valve, which has a first and second valve connection (191, 192), each for one work cylinder (11, 12), a third and fourth valve connection (193, 194), each for one proportional pressure regulating valve (20, 20'), a control inlet (197) for connection of the switching valve (56), and a sixth valve connection (196), which communicates with each pressure chamber (73, 74) via a throttle (88), and that the pressure holding valve (19) is embodied such that in a closing position, the first and second valve connections (191. 192) communicate with one another via a throttle bore (62), and the third, fourth and sixth valve connections (193, 194, 196) are blocked off, and that in an open position, the first valve connection (191) and the third valve connection (193), on the one hand, and the second valve connection (192) and the fourth valve connection (194) on the other, each communicate with one another, and the sixth valve connection (196) communicates with the control inlet (197) of the pressure holding valve (19).

25. The system as defined by claim 1, in which a fourth slide position of the control slide (30) in the main valve (25) is provided as a terminal position (failsafe position), into which the control slide (30) is moved by the restoring spring (29) in the absence of control pressure, and in which the control slide (30) blocks off the three valve connections (21, 22, 23) of the main valve (25)

26. The system as defined by claim 25, in which a damping piston (31), which defines a damping chamber (37) connected to the pilot control valve (26), is rigidly connected to the control slide (30), and that during the opening phase of the pilot control valve (26), a minimum pressure acting upon the damping piston (31) counter to an adjustment direction of the restoring spring (29) is modulated in the damping chamber (37), which minimum pressure prevents a restoration of the control slide (30) to a terminal position.

27. The system as defined by claim 26, in which the damping piston (31) is embodied on a segment (31) of the control slide (30) defining a control chamber (32), and the damping chamber (37) is embodied directly adjoining the control chamber (32) and open toward the control chamber, and that the pilot control valve (26) connected to the control chamber (32) is additionally connected to the damping chamber (37).

28. The system as defined by claim 1, in which the pilot control valve (26) has a proportional magnet (49), which for valve opening drives a valve member (41) that is urged in the closing direction by a valve closing spring (48).

29. The system as defined by claim 26, in which the damping piston comprises an annular flange (31) formed on the control slide (30), on a face end of said annular flange remote from the control slide (30), the restoring spring (29) is supported, and whose annular face (33) toward the control slide (30) forms a pressure impingement face of the damping piston; the damping chamber, open toward a control chamber (32), is formed by an axial indentation (37) on a bottom of the control chamber (32) facing an annular pressure impingement face (33) of the annular flange (31), an inside diameter of which indentation is not as large as an outside diameter of the annular flange (31); the damping chamber (37) communicates with the control chamber (32) via a first throttle (50) and with the second valve connection (22), connected with the pressure fluid source (27), via a second throttle (51) of substantially larger cross section; a valve outlet (44) of the pilot control valve (26) communicates with the pressure fluid sink (28) and a valve inlet (43) of the pilot control valve communicates with the control chamber (32); and a minimum exciter current for the proportional magnet (49) of the pilot control valve (26) is adjusted such that an opening cross section of a valve opening (45) uncovered by a valve member (41) is somewhat larger than a throttle cross section of the first throttle (50).

* * * * *